3,336,147
MANUFACTURE OF PIGMENT COMPOSITIONS
John Mitchell and Arthur Topham, Manchester, England, assignors to Imperial Chemical Industries Limited, London, England, a corporation of Great Britain
No Drawing. Filed July 27, 1964, Ser. No. 385,451
Claims priority, application Great Britain, Aug. 12, 1963, 31,740/63
15 Claims. (Cl. 106—288)

This invention relates to pigment compositions having improved resistance to flocculation, and to the manufacture of such pigment compositions.

It is known that certain pigments flocculate in organic media, for example when paints or printing inks containing them are stored, or during slow evaporation of solvent from a thick coating, with resultant loss of tinctorial strength and of homogeneity. Flocculation of pigment in a printing ink can also result in increased viscosity. Many pigments also exhibit crystal-growth or polymorphic change in such media as are used for paints and printing inks and this frequently results in shade-change and loss of tinctorial strength. Phthalocyanine pigments, particularly copper phthalocyanine, frequently suffer from all these defects.

Various procedures have been described for improving the resistance of pigments, particularly phthalocyanine pigments, to flocculation and crystal growth. Thus it has been proposed to coat pigment particles with colourless protective substances. The tinctorial strength of a pigment is reduced by coating in this way. Moreover we have not found this to be an effective means of improving resistance to flocculation.

It has further been proposed in British application No. 9,804/62 to intimately incorporate with a pigment a minor quantity of an organic pigment derivative containing a secondary or tertiary amino group, the nitrogen atom of said group being attached to the remainder of the molecule through a methylene group.

According to the present invention we provide a pigment composition comprising a pigment intimately incorporated with a minor quantity of a polymeric organic pigment derivative in which 2 or more pigment molecules are linked together through divalent linking groups containing nitrogen.

According to the invention also we manufacture a pigment composition by intimately incorporating a pigment with a polymeric organic pigment derivative as aforesaid.

The polymeric organic pigment derivatives used in our invention, though basic in character, are substantially insoluble in dilute acids particularly 6% acetic acid and in organic solvents such as toluene. They are thereby distinguished from the organic pigment derivatives used in British application No. 9,804/62. They may be incorporated with the pigment in various ways, for example during salt milling or acid pasting.

An excellent method for manufacturing the pigment compositions of our invention comprises milling an aqueous suspension of a pigment and a polymeric organic pigment derivative as hereinbefore defined by vigorous agitation with a grinding aid, preferably a particulate grinding aid such as sand or beads of porcelain, glass or insoluble plastic material. If desired, such milling may be carried out in presence of an acid and the suspension may subsequently be basified to liberate the free base form of the derivative.

Certain of the polymeric organic pigment derivatives forming constituents of our pigment compositions, though insoluble in 6% acetic acid may be dissolved in acetic acid of higher strength, e.g. 30% acetic acid. Polymeric condensates of halogenomethylated dimethyldibenzthiazylazobenzene with primary amines or diamines are soluble in this way. Pigment compositions containing such derivatives may be obtained by suspending a pigment in a solution of the derivative in acetic acid of the appropriate strength and basifying the suspension to liberate the free base form of the derivative. This process is particularly useful for the manufacture of yellow pigment compositions in which the pigment is a benzidine yellow pigment.

Polymeric organic pigment derivatives of especial value in the manufacture of our pigment compositions may be obtained from halogenomethylated pigments and primary amines or diamines. For example a halogenomethylated pigment may be reacted with an excess of amine to replace all the halogen atoms by teminal amino groups and the product, with or without isolation may subsequently be reacted with more halogenomethylated pigment. We prefer however to prepare the polymeric organic pigment derivatives by reacting a halogenomethylated pigment directly with a limited quantity of amine. In forming the polymeric organic pigment derivatives the halogenomethylated pigment interacts with less than the stoichiometric amount of amine, but in practice we may use a greater amount of amine than is theoretically required. We may, for example, add amine to a suspension of the halogenomethylated pigment in an inert solvent such as toluene at an elevated temperature e.g. the boiling point. When the condensation is carried out in this way the product is substantially polymeric even when a large excess (e.g. twice the stoichiometric quantity) of amine is used.

As examples of halogenomethylated pigments we may mention bis-(chloromethyl)isodibenzanthrone, bis-, tris-, penta- and octa-(chloromethyl)-copper phthalocyamine, bis and tris-(chloromethyl-4:4'-bis-(6-methylbenzthiazyl) azobenzene and chloromethyl-linquinacridone. Known chloromethylation procedures usually result in mixtures, for example of bis- and tris-compounds.

Amines which may be reacted with such halogenomethylated pigments or mixtures include primary aliphatic amines e.g. methylamine, ethylamine, isopropylamine, octylamine, dodecylamine, cetylamine, ethanolamine; primary cycloaliphatic amines, e.g. cyclohexylamine; primary araliphatic amines e.g. benzylamine; and aliphatic diamines e.g. ethylenediamine and hexamethylene diamine.

It may reasonably be assumed that the polymeric organic pigment derivatives obtained by interacting a halogenomethylated organic pigment (containing from 2 to 8 halogenomethylated groups per molecule) and a primary aliphatic, cycloaliphatic or araliphatic amine are of the formula

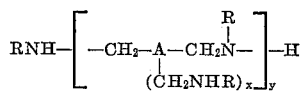

and that those similarly obtained from an aliphatic diamine are of the formula

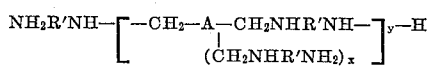

wherein A represents an organic pigment molecule, R represents an aliphatic, cycloaliphatic or araliphatic radical, R' represents an alkylene radical, $x$ is 0 to 6 and $y$ is at least 2. We do not, however, exclude the possibility that the products of such interaction may be or may contain polymers of branched chain type. There may also be multiple links between two organic pigment molecules.

The pigment compositions of the invention are of value as colouring matters for paints, lacquers, enamels, printing inks, plastic materials and the like because they disperse rapidly in non-aqueous media and have a high degree of resistance to flocculation and to crystal growth.

Pigment compositions of the invention which are of great value are those containing blue phthalocyanine pigments, especially copper phthalocyanine pigments, for example copper phthalocyanine itself and its halogeno (particularly monochloro) derivatives, the pigments commonly called benzidine yellows, which are obtained by coupling tetrazotised benzidine and its derivatives (e.g. 3:3'-dichlorobenzidine) with acetoacetanilides, the quinacridone red pigments, and the chome yellow pigments. Such pigment compositions show pronounced advantages over the parent pigments in being more stable in shade and strength in paint and printing ink media and in that printing inks containing them are less viscous.

It is generally desirable that in the pigment compositions of the invention a polymeric organic pigment derivative should be incorporated with a pigment of the same colour, and this may often be accomplished by using a derivative of the particular pigment whose properties it is desired to improve, for example by incorporating a copper phthalocyanine derivative with copper phthalocyanine itself. Sometimes, however, it is desirable to alter slightly the shade of a pigment and in this case the polymeric organic pigment derivative may be of a different colour from the pigment.

The proportions of pigment and organic pigment derivative in the pigment composition of the invention are not critical. We find that pigment compositions containing from 1 to 20%, and especially from 2% to 10% by weight of the organic pigment derivative have excellent properties.

The pigment compositions of the present invention are superior to those of British application No. 9,804/62 because the polymeric organic pigment derivatives contained in the compositions do not diffuse from a paint layer into an oversprayed layer and because they do not diffuse from printed wrapping material into fatty materials such as soap.

We now describe the manufacture of the polymeric organic pigment derivatives used in the examples which follow. In the description and examples all parts and percentages are by weight.

POLYMERIC ORGANIC PIGMENT DERIVATIVE I 278 parts of isopropylamine is stirred whilst 100 parts of copper tris-(chloromethyl)phthalocyanine is added. After stirring and refluxing 16 hours the excess isopropylamine is removed by steam distillation. The solid copper tris-(isopropylaminomethyl)phthalocyanine is filtered off, washed with water and dried. It is readily soluble in dilute acetic acid and in toluene to give deep blue coloured solutions. A mixture of 14 parts of copper tris-(chloromethyl) phthalocyanine, 46 parts of copper tris-(isopropylaminomethyl)phthalocyanine and 80 parts of methyl isobutyl ketone is stirred for 16 hours at 90° to 100°. After cooling, 100 parts of water and 68 parts of 30% sodium hydroxide solution are added. The ketone is removed by steam distillation and the solid is filtered off, washed with water and dried. The product is only partly soluble in dilute acetic acid and almost insoluble in toluene.

A similar product may be made as follows:

A mixture of 61 parts isopropylamine and 363 parts toluene is stirred at 20–25° C. while 100 parts of copper tris-(chloromethyl)phthalocyanine is added during 15 minutes. After stirring 2 hours at 20–25°, the temperature is raised to 80° during 100 minutes. After stirring, 16 hours at 80–85°, the toluene is removed by steam distillation. The product is filtered off, washed and dried. It is soluble in 30% acetic acid but almost insoluble in 6% acetic acid.

POLYMERIC ORGANIC PIGMENT DERIVATIVE II 720 parts of ethylene diamine is stirred and cooled whilst 200 parts of copper tris-(chloromethyl)phthalocyanine is gradually added during half an hour. After stirring for 16 hours at 90° to 100° and diluting with 3500 parts of water, the solid copper tris($\beta$-aminoethylaminomethyl) phthalocyanine is filtered off, washed with water and dried. It is readily soluble in dilute acetic acid to give a deep blue solution. A mixture of 7.3 parts of copper tris-(chloromethyl)phthalocyanine, 24 parts of copper tris($\beta$-aminoethylaminoethyl)phthalocyanine and 40 parts of methyl isobutyl ketone is stirred 16 hours at 90°–100° C. After cooling, the solid is filtered off, washed with methanol then with water and stirred for 2 hours at 90° C. to 100° C. with 200 parts of water and 6.5 parts of 30% sodium hydroxide solution. The solid is filtered off, washed with water and dried. It is almost insoluble in dilute acetic acid.

An alternative way of making a similar product is as follows:

A mixture of 9 parts of 98.2% ethylene diamine and 35 parts toluene is stirred while 10 parts of copper tris-(chloromethyl)phthalocyanine is added. After stirring 16 hours on a steam bath and removing the toluene by steam distillation, the product is filtered off, washed and dried. It is almost insoluble in 20% acetic acid.

POLYMERIC ORGANIC DERIVATIVE III

A mixture of 5.7 parts octadecylamine, 26 parts toluene and 15 parts of 15% sodium carbonate solution is stirred while 10 parts of copper tris-(chloromethyl)phthalocyanine is added. After stirring 16 hours on a steam bath and removing toluene by steam distillation, the product is filtered off, washed and dried. It is insoluble in 6% acetic acid and only sparingly soluble in toluene.

POLYMERIC ORGANIC PIGMENT DERIVATIVE IV

A mixture of 6.6 parts 2-hydroxypropylamine and 40 parts water is stirred while 10 parts copper tris-(chloromethyl)phthalocyanine is added. After stirring 16 hours on a steam bath, the product is filtered off, washed and dried. It is insoluble in 6% acetic acid.

POLYMERIC ORGANIC PIGMENT DERIVATIVE V

A mixture of 5.1 parts of cyclohexylamine and 14 parts water is stirred while 4 parts of copper penta-(chloromethyl)phthalocyanine is added. After stirring 6½ hours on a steam bath the product is filtered off, washed and dried. It is insoluble in 6% acetic acid.

A similar product may be made as follows:

A mixture of 40 parts of cyclohexylamine and 156 parts of toluene is stirred at 20–25° C. while 32 parts of copper penta(chloromethyl)phthalocyanine is added during 15 minutes. After stirring 2 hours at 20–25° the temperature is raised during 2 hours to 90°. After stirring 16 hours at 90–95°, the toluene is removed by steam distillation. The product is filtered off, washed and dried. It is insoluble in 6% acetic acid.

ORGANIC PIGMENT DERIVATIVE VI

A mixture of 2.9 parts of isopropylamine and 17 parts of toluene is stirred while 4 parts of copper hexa-(chloromethyl)phthalocyanine is added. After stirring 16 hours on a steam bath and removing toluene by steam distillation, the product is filtered off, washed and dried. It is insoluble in 6% acetic acid.

POLYMERIC PIGMENT DERIVATIVE VII

A mixture of 6.75 parts of cyclohexylamine and 14 parts of water is stirred while 4 parts of copper octa-(chloromethyl)phthalocyanine is added. After stirring 16 hours on a steam bath, the product is filtered off, washed and dried. It is insoluble in 6% acetic acid.

POLYMERIC PIGMENT DERIVATIVE VIII

A mixture of 270 parts of 98% ethylene diamine and 200 parts water is stirred below 30° C. while 171 parts of copper tris(chloromethyl)phthalocyanine is added. After stirring 16 hours at 20°, the temperature is raised to 90° during 70 minutes. After stirring 4 hours at 90°, the product is filtered off, washed and dried. It is insoluble in acetic acid of any concentration and is regarded as a product of higher molecular weight than Polymeric Pigment Derivative II.

POLYMERIC PIGMENT DERIVATIVE IX

A mixture of 216 parts of cyclohexylamine and 866 parts of toluene is stirred at 20–25° C. while 250 parts of copper tris(chloromethyl)phthalocyanine is added during 1 hour. After stirring 2 hours at 20–25°, the temperature is raised to 90° during 2 hours. After stirring 16 hours at 90–95° the toluene is removed by steam distillation. The product is filtered off, washed and kept as a filter cake. It is insoluble in 6% acetic acid.

POLYMERIC PIGMENT DERIVATIVE X

A mixture of 18 parts of 3-dimethylaminopropylamine, 110 parts water and 29.7 parts of 30% sodium hydroxide solution is stirred at 20–25° C. while 48 parts copper tris-(chloromethyl)phthalocyanine is added during 15 minutes. After stirring 2 hours at 20–25°, the temperature is raised to 90° during 2 hours. After stirring 16 hours at 90–95°, 50 parts water is added, and the product is filtered off, washed and dried.

POLYMERIC PIGMENT DERIVATIVE XI

A mixture of 21.6 parts of cyclohexylamine and 86.6 parts toluene is stirred at 20–25° C. while 25 parts of a mixture of mono- and bis-(chloromethyl)isodibenzanthrone (containing 11.6% chlorine) is added during 15 minutes. After stirring 2 hours at 20–25°, the temperature is raised to 90° during 2 hours. After stirring 16 hours at 90–95° and removing toluene by steam distillation, the product is filtered off, washed and dried. It is insoluble in 6% acetic acid, but soluble in 30% acetic acid.

POLYMERIC PIGMENT DERIVATIVE XII

A mixture of 21.6 parts of cyclohexylamine and 86.6 parts of toluene is stirred at 20–25° C. while 25 parts of a mixture of bis- and tris-(chloromethyl)-4:4'-bis-(6-methylbenzthiazyl)azobenzene (containing 13.8% chlorine) is added during 15 minutes. After stirring 2 hours at 20–25°, the temperature is raised to 90° during 2 hours. After stirring 16 hours at 90–95° and removal of toluene by steam distillation, the product is filtered off, washed and dried. It is insoluble in 6% acetic acid but soluble in 30% acetic acid.

POLYMERIC PIGMENT DERIVATIVE XIII

A mixture of 233 parts of benzylamine and 866 parts of toluene is stirred at 20–25° C. while 250 parts of copper tris-(chloromethyl)phthalocyanine is added during 1 hour. After stirring 2 hours at 20–25°, the temperature is raised to 90° during 2 hours. After stirring 16 hours at 90–95° the toluene is removed by steam distillation. The product is filtered off, washed and dried.

The invention is illustrated but not limited by the following examples.

Example 1

30.0 parts of crude copper phthalocyanine (as obtained by reacting phthalic anhydride, urea and cupric chloride in the presence of a catalyst and an inert diluent), 1.5 parts of Polymeric Organic Pigment Derivative I, 4.5 parts of 80% phosphoric acid, and 115 parts water are stirred rapidly in a stainless steel beaker with 360 parts of sand of particle size 0.25 to 0.3 millimetre. Stirring is continued for 3 hours with the stirrer driven at about 1800 revolutions per minute. The pigment suspension is sieved to remove the sand and basified by the addition of aqueous sodium hydroxide solution. The pigment composition is then filtered off, washed free from alkali with cold water and is dried at 90° to 95° C.

Compared with a pigment obtained in similar manner without incorporating the polymeric organic pigment derivative the product shows improved rate of dispersion in paint media and much improved resistance to flocculation. The product also has excellent tinctorial strength.

Example 2

30 parts of the crude copper phthalocyanine used in Example 1, 1.5 parts of Polymeric Organic Pigment Derivative II, 4.5 parts of 80% phosphoric acid and 115 parts of water are stirred rapidly in a stainless steel beaker with 360 parts of sand of particle size 0.25 to 0.3 millimetre. Stirring is continued for 3 hours with the stirrer driven at about 1800 revolutions per minute and the pigment suspension is then separated from the sand. The suspension is basified with dilute aqueous sodium hydroxide, and the pigment is filtered off, washed and dried.

This pigment composition when used to print wrapping material for soap tablets does not discolour the soap. When incorporated into a paint film it does not cause staining of an oversprayed white paint. It also has excellent resistance to flocculation in paint films.

The following table gives further examples illustrating the manufacture of pigment compositions by milling together the ingredients indicated in columns 2, 3, 4 and 5 using the technique described in Example 1 above, separating from the grinding aid, basifying, filtering off the solid product, washing and drying. In the table CuPc represents copper phthalocyanine. In Examples 3–10 the milling time is 1 hour, and in Examples 11–15 the milling time is 3 hours.

| Example | Pigment | Polymeric Pigment Derivative | Water (parts) | Acid |
|---|---|---|---|---|
| 3 | Monochloro CuPc, 32 parts; CuPc (α-form), 48 parts. | II, 4 parts | 221 | Glacial Acetic, 95 parts. |
| 4 | ----- do ----- | VIII, 4 parts | 221 | Do. |
| 5 | ----- do ----- | IX, 4 parts | 221 | Do. |
| 6 | ----- do ----- | X, 4 parts | 221 | Do. |
| 7 | ----- do ----- | XI, 4 parts | 221 | Do. |
| 8 | ----- do ----- | XIII, 4 parts | 221 | Do. |
| 9 | Monochloro CuPc, 80 parts | IX, 4 parts | 221 | Do. |
| 10 | ----- do ----- | IX, 16 parts | 221 | Do. |
| 11 | CuPc, 20 parts | III, 1 part | 97 | 80% phosphoric, 5 parts. |
| 12 | ----- do ----- | IV, 1 part | 97 | Do. |
| 13 | ----- do ----- | V, 1 part | 97 | Do. |
| 14 | ----- do ----- | VI, 1 part | 97 | Do. |
| 15 | ----- do ----- | VII, 1 part | 97 | Do. |

In the above examples aqueous acetic and phosphoric acids are used as media for manufacture of the pigment compositions. The choice of acid is not a critical factor and other acids which have been used equally successfully include hydrochloric, sulphuric, lactic, chloracetic, and formic acids.

The products obtained as indicated in the table all have excellent tinctorial strength and better resistance to flocculation in air drying alkyd than the pigments from which they are obtained. The products of Examples 4, 5 and 13 have outstanding overspray fastness in stoving media and the product of Example 5 is also outstanding in its resistance against diffusion from printed wrapping material into soap.

Example 16

A mixture of 108 parts of an 18.6% paste of Monolite Yellow 2GL (Colour Index ref. C.I. 21,105), 100 parts of water, and 20 parts of a 5% solution of Polymeric Pigment Derivative XII in 30% acetic acid is stirred for 15 minutes, and then made alkaline by gradual addition of 4 N ammonium hydroxide solution. The solid is filtered off, washed free from electrolyte, and dried at 70° C. The product is superior to Monolite Yellow 2GL in resistance to flocculation in air drying alkyd media.

The viscosity of a printing ink obtained by milling the product with 3 parts of lithographic varnish is lower than that of a corresponding ink made from Monolite Yellow 2GL over a wide range of rates of shear, as measured with a Ferranti-Shirley cone-and-plate viscometer at 25°:

| Rate of Shear (sec.$^{-1}$) | Viscosity (poise) | |
|---|---|---|
| | Treated Pigment | Untreated Pigment |
| 1.39 | 11,800 | 17,400 |
| 5.56 | 4,300 | 5,600 |
| 20.9 | 1,640 | 1,940 |
| 69.5 | 652 | 810 |

*Example 17*

A mixture of 91 parts of 22% Monolite Yellow GN paste (Colour Index reference C.I. 11,680), 100 parts of water, and 20 parts of a 5% solution of Polymeric Pigment Derivative XII in 30% acetic acid is stirred for 15 minutes, and then made alkaline by the gradual addition of 4 N ammonium hydroxide, the solid is filtered off, washed free of electrolyte, and dried at 70° C. The product is superior to Monolite Yellow GN in tinctorial strength in air drying alkyd medium. The viscosity of a printing ink containing 25% of the product is only 252 poises at 25° and a rate of shear of 1.54 sec.$^{-1}$, compared with a viscosity of 524 poises for a corresponding ink from Monolite Yellow GN.

*Example 18*

Example 17 is repeated using Monolite Yellow 10G (Colour Index reference C.I. 11,710) in place of Monolite Yellow GN. The product is superior to Monolite Yellow 10G in tinctorial strength in air drying alkyd medium. The viscosity of a printing ink containing 25% of the product is 160 poises at a rate of shear of 1.54 sec.$^{-1}$ compared with a viscosity of 201 for a corresponding ink from Monolite Yellow 10G.

What we claim is:

1. A pigment composition consisting essentially of a pigment intimately incorporated with from 1 to 20% by weight of a polymeric organic pigment derivative in which at least two pigment molecules are linked together through divalent linking groups containing nitrogen, said polymeric organic pigment derivative being a condensate of
   (i) a chloromethyl compound selected from the class consisting of copper halogenomethylphthalocyanines containing from 2 to 8 chloromethyl groups, chloromethyl dimethyl dibenzthiazylazobenzenes containing from 2 to 3 chloromethyl groups and dichloromethylisodibenzanthrones with
   (ii) an amine selected from the class consisting of primary aliphatic, cycloaliphatic and araliphatic amines and diamines,
said polymeric organic pigment derivative being substantially insoluble in 6% aqueous acetic acid.

2. A pigment composition according to claim 1 wherein the percentage by weight of polymeric organic pigment derivative is from 2% to 10%.

3. A pigment composition according to claim 1 wherein the pigment is selected from the group consisting of a phthalocyanine pigment, a benzidine yellow pigment, a quinacridone red pigment and a chrome yellow pigment.

4. A pigment composition according to claim 1 wherein the pigment is a copper phthalocyanine pigment.

5. A pigment composition according to claim 1 wherein the pigment is copper phthalocyanine.

6. A pigment composition according to claim 1 wherein the pigment is copper monochlorochlorophthalocyanine.

7. A pigment composition according to claim 1 wherein the polymeric organic pigment derivative is of the formula

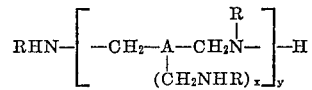

wherein A represents the radical of said chloromethyl compound, R represents a radical selected from the group consisting of an aliphatic, cycloaliphatic and araliphatic radical, $x$ is 0 to 6 and $y$ is at least 2.

8. A pigment composition according to claim 1 wherein the polymeric organic pigment derivative is of the formula

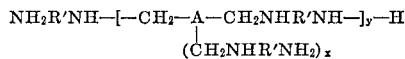

wherein A represents the radical of said chloromethyl compound, R' represents an alkylene radical, $x$ is 0 to 6 and $y$ is at least 2.

9. A pigment composition according to claim 1 wherein the polymeric organic pigment derivative is a condensate of a halogenomethylated copper phthalocyanine containing from 2 to 8 chloromethyl groups with a primary aliphatic diamine.

10. A process for the manufacture of a pigment composition according to claim 1 which comprises milling an aqueous suspension of a pigment and a polymeric organic pigment derivative as defined in claim 1 by vigorous agitation with a particulate grinding aid in the presence of an acid and subsequently basifying to liberate the free base form of the said derivative.

11. A process according to claim 10 wherein there is used a pigment as defined in claim 4.

12. A process according to claim 11 wherein there is used a polymeric organic pigment derivative as defined in claim 9.

13. A process for the manufacture of a pigment composition comprising a pigment initimately incorporated with a polymeric condensate of a halogenomethylated dimethyldibenzthiazylazobenzene with an amine selected from the class consisting of primary aliphatic, cycloaliphatic and araliphatic amines and diamines which process comprises suspending said pigment in a solution of said polymeric condensate in aqueous acetic acid of sufficient strength to dissolve said polymeric condensate and basifying the suspension to liberate the free base form of said polymeric condensate.

14. A coating composition including the pigment composition of claim 1 and a vehicle therefor.

15. A pigmented plastic composition including the pigment composition of claim 1.

References Cited

UNITED STATES PATENTS

| 2,855,403 | 10/1958 | McKellin et al. | 106—288 |
| 3,065,092 | 11/1962 | Geiger et al. | 106—288 |
| 3,288,621 | 11/1966 | Barron et al. | 106—288 |

TOBIAS E. LEVOW, *Primary Examiner.*

HELEN M. McCARTHY, *Examiner.*

J. E. POER, *Assistant Examiner.*